US006868328B2

(12) United States Patent
Fulton

(10) Patent No.: US 6,868,328 B2
(45) Date of Patent: Mar. 15, 2005

(54) DIESEL ENGINE FUEL CONTROL SYSTEM

(75) Inventor: Brien Lloyd Fulton, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/604,113

(22) Filed: Jun. 26, 2003

(65) Prior Publication Data

US 2004/0267432 A1 Dec. 30, 2004

(51) Int. Cl.[7] .................................................. B60T 7/12

(52) U.S. Cl. ....................... 701/104; 701/112; 701/114; 701/107; 123/488; 60/780

(58) Field of Search ................................. 701/104, 107, 701/112, 114, 115; 60/780; 123/488

(56) References Cited

U.S. PATENT DOCUMENTS 4,120,373 A * 10/1978 Fleischer .................... 180/179
4,660,519 A * 4/1987 Stocker et al. ......... 123/339.22
5,091,858 A * 2/1992 Paielli ........................ 701/115
5,313,923 A * 5/1994 Takeuchi et al. ............ 123/497
5,445,126 A 8/1995 Graves, Jr. .................. 123/399
5,529,039 A 6/1996 Streib ......................... 123/399
6,196,188 B1 3/2001 Janic et al. ................. 123/350

* cited by examiner

*Primary Examiner*—Willis R. Wolfe
*Assistant Examiner*—Johnny H. Hoang

(57) ABSTRACT

A method and system for controlling fuel for an internal combustion engine. Two fuel demand signals are provided, one from an idle speed fuel controller (i.e., a base fuel demand signal) and one from pedal position (i.e., an unmodified pedal fuel demand signal). The pedal position signal is a function of engine speed and actual pedal position. A modified pedal position fuel demand signal is produced. The modified pedal fuel demand signal is equal to the unmodified pedal fuel demand increased by a bias value. The bias value is a predetermined offset, or hysteresis value, from the base fuel demand signal. The actual fuel supplied to the engine is equal to the greater of the base fuel demand signal and the modified pedal fuel demand signal. With such method, the amount of dead pedal time delay is reduced.

6 Claims, 4 Drawing Sheets

DIESEL ENGINE FUEL CONTROL SYSTEM

BACKGROUND OF INVENTION

1. Technical Field

This invention relates generally to diesel engine fuel control systems and more particularly to diesel engine fuel control systems adapted to reduce dead-pedal effects.

2. Background

As is known in the art, diesel engines operate at idle with idle fuel supplied from an idle speed fuel controller. When the operator wishes to accelerate a vehicle having a diesel engine from idle, he or she actuates an acceleration device, such as a foot pedal, typically referred to as an accelerator pedal. Thus, referring to FIG. 1, at idle, i.e., when the engine is in idle with the pedal position is at zero degrees, (i.e., the operator removes his or her foot from the accelerator pedal), the engine is supplied an amount of fuel from the idle speed fuel controller sufficient to maintain idle. The required idle fuel amount takes into consideration such things as accessory load, transmission load, etc. The amount of fuel supplied by the idle speed fuel controller is shown in FIG. 1.

Also shown in FIG. 1 is the amount of fuel demanded from acceleration pedal position depression, i.e., pedal position demanded fuel when the operator wishes to move the vehicle from its idle position. Thus, in FIG. 1, prior to time T1 the engine is in idle and the pedal is the zero degree position. The pedal is depressed beginning at time T1 and here, for example, increases somewhat linearly. It is noted that the amount of fuel actually supplied to the engine will be the greater of: (1) the required idle fuel supplied by the idle speed fuel controller; and (2) the pedal position demanded fuel. Thus, it is noted that until the pedal position demanded fuel exceeds the idle fuel supplied by the idle speed fuel controller, here at time T2, the fuel actually supplied to the engine is that from the idle speed fuel controller. Thus, there is no response of the engine to the pedal action of the operator between time T1 and time T2. This non-responsiveness of the engine to the operator demand is referred to as "dead pedal" delay. This dead pedal "delay" reduces the "performance-feel" of the vehicle to the operator.

SUMMARY OF INVENTION

In accordance with the present invention a fuel control system is provided for an internal combustion engine. The fuel control system includes an idle speed fuel controller for producing a base fuel demand signal. The base fuel demand signal is sufficient to maintain the engine in an idle condition. An accelerator pedal fuel demand signal generator is provided. The accelerator pedal fuel demand signal generator is responsive to accelerator pedal position for producing an unmodified pedal position fuel demand signal. The unmodified pedal position fuel demand signal is a function of accelerator pedal position. A controller is provided for producing a modified pedal position fuel demand signal. The modified pedal fuel demand signal is equal to the unmodified pedal fuel demand increased by a bias value. The bias value is a predetermined offset, or hysteresis value, from the base fuel demand signal. The actual fuel signal supplied to the engine is the greater of the base fuel demand signal and the modified pedal fuel demand signal. With such system, the amount of dead pedal time delay is reduced.

In accordance with another feature of the invention, a method is provided for controlling fuel for an internal combustion engine. The method includes providing two fuel demand signals, one from an idle speed fuel controller (i.e., the base fuel demand signal) and one from pedal position (i.e., an unmodified pedal fuel demand signal). The pedal position signal is a function of engine speed and actual pedal position. A modified pedal position fuel demand signal is produced. The modified pedal fuel demand signal is equal to the unmodified pedal fuel demand increased by a bias value. The bias value is a predetermined offset, or hysteresis value, from the base fuel demand signal. The actual fuel supplied to the engine is equal to the greater of the base fuel demand signal and the modified pedal fuel demand signal. With such method, the amount of dead pedal time delay is reduced.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
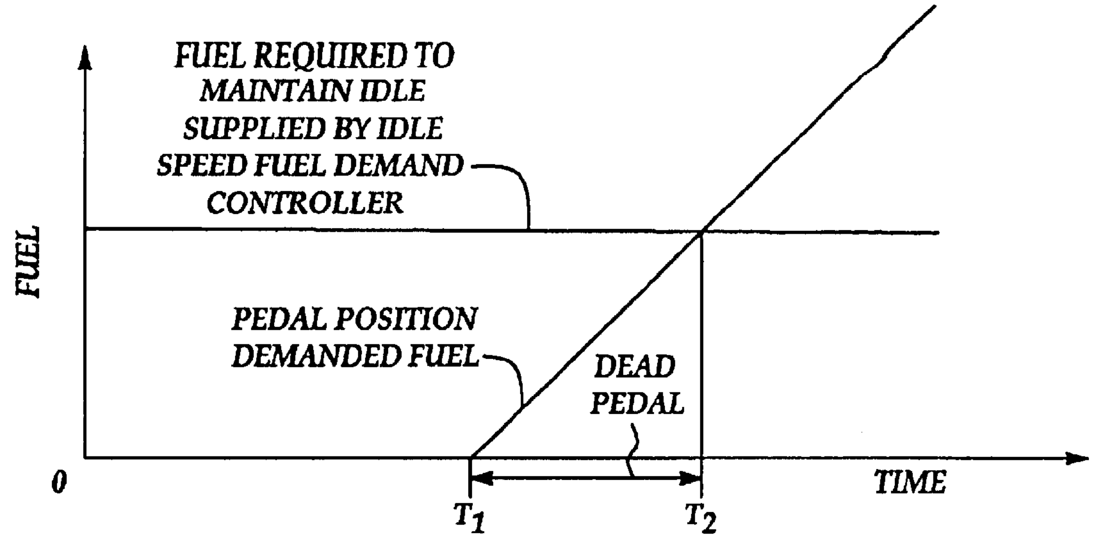
FIG. 1 Prior Art
FIG. 1 is a diagram useful in understanding a fuel control system according to the PRIOR ART.
Figure 2:
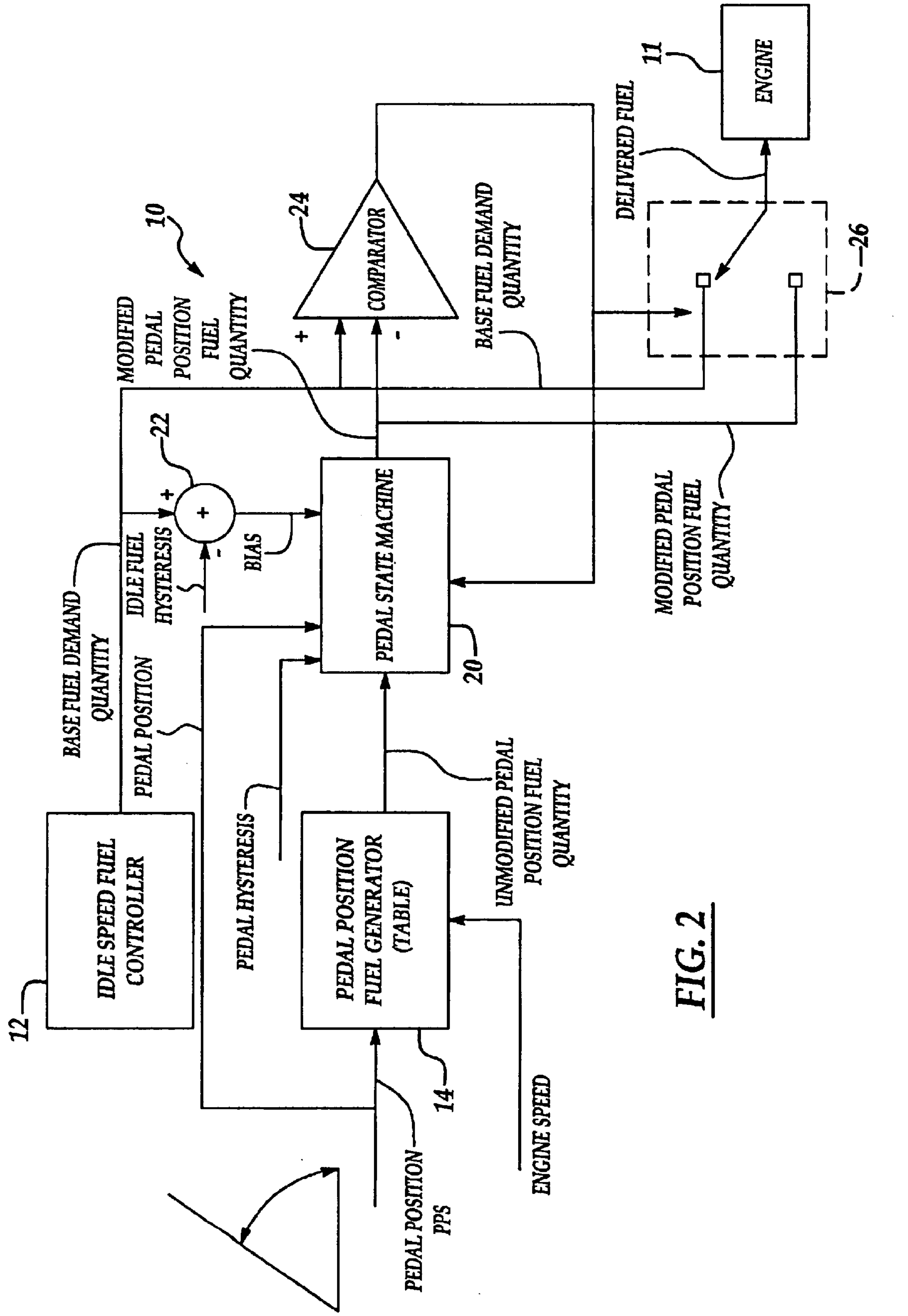
FIG. 2 is a block diagram of a fuel speed control system for an internal combustion engine in accordance with the invention.

Referring now to FIG. 2, an idle control system 10 is shown for an internal combustion engine 11, here a lean burn, diesel engine. The idle control system includes an idle speed fuel controller 12 for producing a base fuel demand signal shown in both FIGS. 1 and 3 and indicated by the same numerical designation 13 in both FIG. 1 and FIG. 3. The base fuel demand signal is sufficient to maintain the engine 11 in an idle condition.

Figure 3:
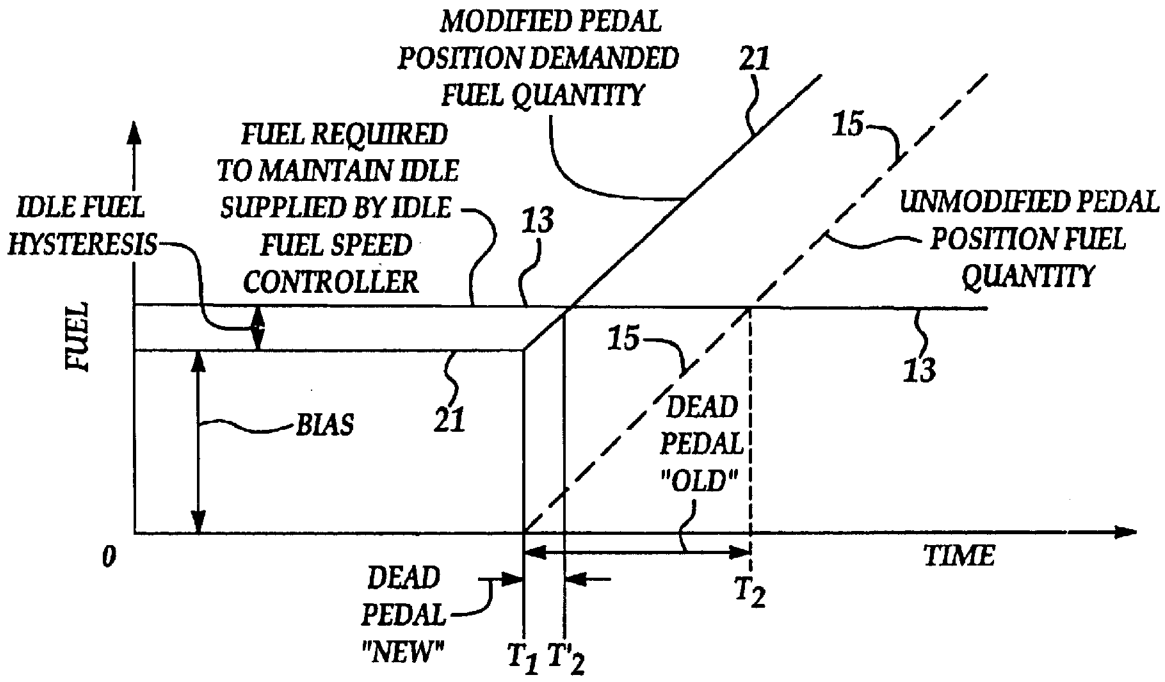
FIG. 3 is a diagram useful in understanding a fuel control system according to the invention.

An accelerator pedal fuel demand signal generator 14 is provided. The accelerator pedal fuel demand signal generator 14 is responsive to accelerator pedal position and engine speed. Here the accelerator pedal fuel demand signal generator 14 is a table and produces an unmodified pedal position fuel demand signal. The unmodified pedal position is here the accelerator pedal position signal shown in FIG. 1 and designated in FIG. 1 by numerical designation 15. This unmodified pedal position fuel control signal is also shown in FIG. 3 by a dotted line having the same numerical designation 15 as in FIG. 1.

Figure 5:
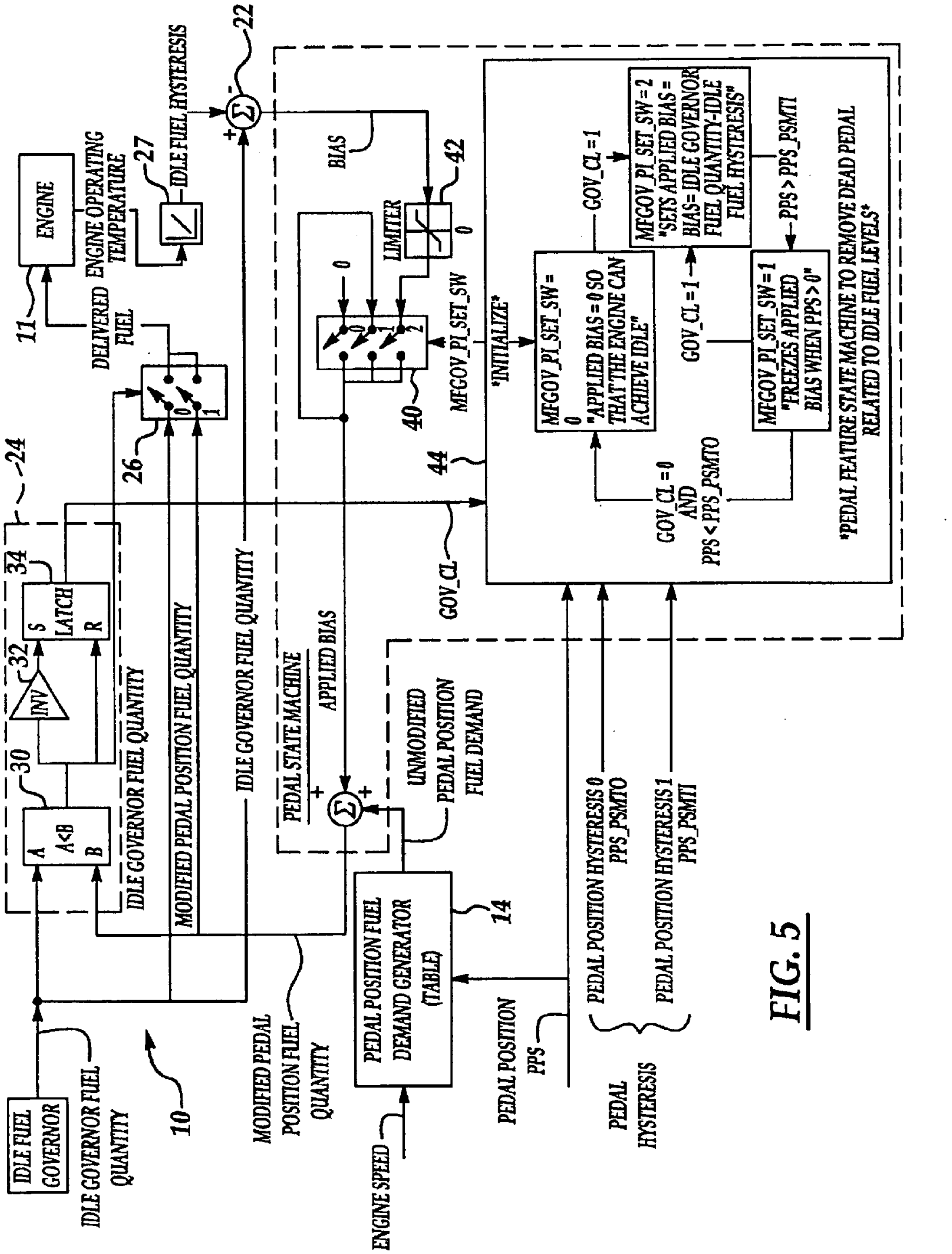
FIG. 5 is a more detailed block diagram of the fuel speed control system of FIG. 2.

Referring again to FIG. 2, the fuel control system 10 includes a controller 20, here a pedal position state machine, here a semiconductor chip, shown in more detail in FIG. 5. Suffice it to say here, however, that the controller 20 produces a modified pedal position fuel demand signal indicated in FIG. 3 by numerical designation 21. The modified pedal fuel demand signal is equal to the unmodified pedal fuel demand signal produced by accelerator pedal fuel demand signal generator 14 (FIG. 2) increased by a bias value. Under certain conditions to be described in more detail below, the bias value is a predetermined offset, or hysteresis value, from the base fuel demand signal. Thus, the modified fuel control signal is indicated in FIG. 3 by the numerical designation 21.

More particularly, the bias is initialized to zero. When the pedal position exceeds a predetermined, relatively small, say 0.05 degrees, pedal position tip-in constant, the bias is a function of the idle speed fuel controller 12 fuel signal minus a fixed, predetermined hysteresis value. Thus, a subtractor 22 forms the bias value equal to the base fuel demand produced by idle speed fuel controller 12 minus the idle fuel hysteresis value, as shown, in FIGS. 2 and 3.

The controller 20 provides an actual fuel control signal for the engine 11. The actual fuel signal is equal to the greater of the base fuel demand signal 13 (FIG. 3) and the modified pedal fuel demand signal 21 (FIG. 3). Thus, in FIG. 3, prior to time T1 the engine is in an idle condition and the pedal is the zero degree position. The pedal is depressed beginning at time T1 and here, for example, increases somewhat linearly. It is noted that the amount a fuel actually supplied to the engine will be the greater of: (1) the required idle fuel supplied by the idle speed fuel controller 12 (i.e., curve 13); and (2) the modified pedal position demanded fuel (i.e., curve 21). Thus, it is noted that until the pedal position demanded fuel exceeds the required idle fuel supplied by the idle speed fuel controller 12, here at time T'2, the fuel actually supplied to the engine is that from the idle speed fuel controller 12. Thus, with the added bias to the unmodified pedal position signal 15, the dead pedal "delay" (i.e., DEAD PEDAL "NEW") is reduced from DEAD PEDAL "OLD" and the "performance-feel" of the vehicle to the operator is improved.

More particularly, the system 10 includes a comparator 24 fed by the idle speed fuel controller 12 and the modified pedal position fuel signal to produce a control signal for switch 26. The switch 26, in response to the control signal selects whether the idle speed fuel controller 12 fuel signal or the modified fuel signal is supplied as the fuel deliver signal the engine 11. As noted above the amount a fuel actually supplied to the engine 11 will be the greater of: (1) the required idle fuel supplied by the idle speed fuel controller 12 (i.e., curve 13); and (2) the modified pedal position demanded fuel (i.e., curve 21), FIG. 3. Referring to FIG. 3 it is noted that the system reduces the amount of dead pedal time delay is reduced.

Figure 4:
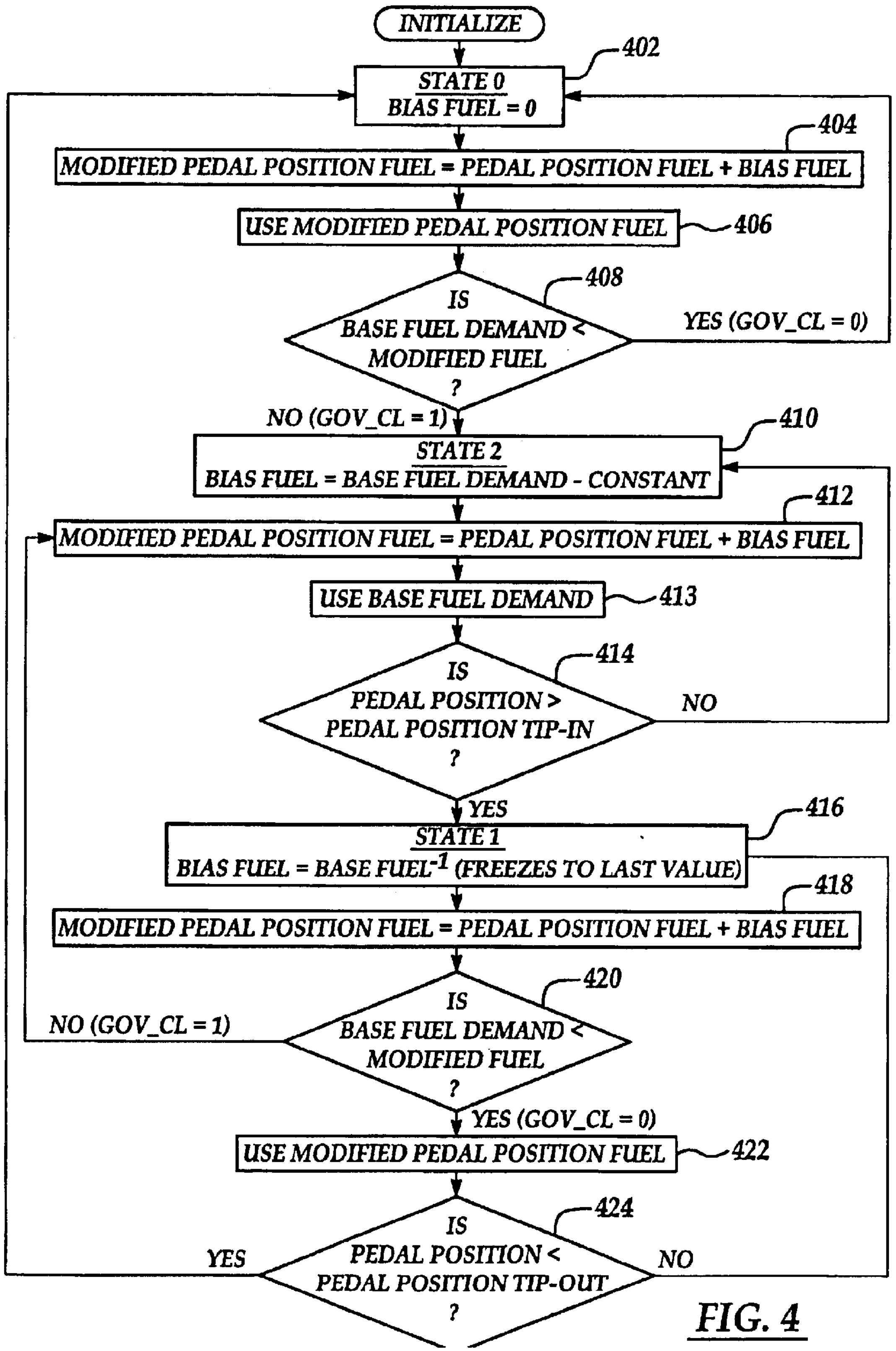
FIG. 4 is a flow diagram of the method used to control fuel with the fuel control system of FIG. 2.

Referring now to FIG. 4, a flow diagram is shown of the overall method used to provide the fuel delivered to the engine by the system of FIG. 2. The process is initialized when the engine starts. This is referred to as State 0 and bias fuel is set to 0, Step 402.

Next, in Step 404, the modified pedal position fuel is calculated as being equal to the pedal position fuel plus the bias fuel.

In Step 406 the modified pedal position fuel is used as the actual fuel signal for the engine 11.

In Step 408, a determination is made as to whether the base fuel demand from the idle speed fuel controller 12 is less than the calculated modified pedal position fuel. If YES, the process returns to Step 402. This condition is referred to as GOV_CL=0. Otherwise, the process proceeds to Step 410, which is referred to as GOV_CL=1.

In Step 410, the process enters state 2 and the bias fuel is calculated as being equal to the idle fuel minus a factory-calibrated constant, referred to as idle fuel hysteresis.

In Step 412, the modified pedal position fuel is calculated as being equal to the pedal position fuel plus the bias fuel calculated in state 2. In Step 413, the process uses the base fuel demand from the idle speed fuel controller 12 as the actual fuel signal for the engine 11. In Step 414 a determination is made as to whether the pedal position is greater than a calibrated constant referred to as pedal position tip-in stored within the pedal state machine 20 (FIG. 2). If it is not, the process returns to Step 410; otherwise, the process proceeds to Step 416 and enters state 1. Here, the bias fuel calculated in Step 410 is maintained (or "frozen"). Next, in Step 418, a calculation is made of modified pedal position fuel as being equal to pedal position fuel plus the frozen bias fuel calculated in Step 416.

In Step 420, a determination is made as to whether the base fuel demand from the idle speed fuel controller 12 is less than the modified pedal position fuel. If is not, the process returns to Step 412 (i.e., indicated as GOV_CL=1); otherwise, the process proceeds to Step 422 (indicated as GOV_CL=0). Next, if still in state 1, a determination is made as to whether the pedal; position is less than the factory calibrated pedal position tip-out constant stored in the state machine 20 (FIG. 2), Step 424. If it is, the process returns to Step 402 (i.e., State 0); otherwise, the process returns to Step 416, State 1, where the bias fuel is maintained, or frozen.

Referring now to FIG. 5, the system 10 is shown in more detail. It is noted that the modified pedal position fuel signal produced by the pedal state machine 20 is the sum of the unmodified pedal position fuel signal produced by the pedal position fuel demand generator 14 and an APPLIED BIAS signal. The APPLIED BIAS signal is either: zero (0), which is produced after initialization and before the base fuel demand from the idle speed fuel controller 12 has exceeded the modified pedal position fuel; (2) a BIAS signal which is the base fuel demand from the idle speed fuel controller 12 minus an idle fuel hysteresis level, here an experimentally determined function of engine operating temperature. The function is stored in a table 27 in FIG. 2. The BIAS signal, which is the base fuel demand from the idle speed fuel controller 12 minus an idle fuel hysteresis level, is produced by the subtractor 22, as indicated. This is produced when the base fuel demand from the idle speed fuel controller 12 has exceeded the modified pedal position fuel; or (1) the BIAS signal "frozen" to the previous BIAS level produced in (2) which is produced when pedal position has exceed a predetermined pedal position tip-in constant, here designated as "pedal position hysteresis 1".

The comparator 24 includes a comparator unit 30, which feeds an inverter 32. The comparator 24 also includes a latch 34. The outputs of the comparator unit 24 and the inverter 30 are fed to the Set and Reset terminals, respectively, of the latch 34, as shown. The latch provides a signal to the pedal position state machine 20, such signal, here designated as GOV_CL, referred to above in FIG. 4, being a logic 1 when the modified pedal position fuel signal is greater than the base fuel demand from the idle speed fuel controller 12; otherwise GOV_CL is a logic 0. Further, the output of the comparator unit 30 provides the control signal to the switch 26. When the control signal is logic 0, the base fuel demand from the idle speed fuel controller 12 is coupled through switch 26 to the engine 11; otherwise, the modified pedal position fuel signal is fed through switch 26 to the engine 11.

The pedal state machine 20 includes a switch 40. Switch 40 has a terminal 0 thereof fed with a zero; has a terminal 1 thereof fed with the APPLIED BIAS signal produced at the output of switch 40; and, has a terminal 2 thereof fed by the BIAS signal produced by subtractor 22 after such BIAS signal passes through a limiter 42, as shown.

The control signal MF_PI_SET_SW for switch 40 is produced by logic section 44. When the control signal MF_PI_SET_SW is in a 0 state, the level at terminal 0 of switch 40 (here 0) is used as the APPLIED BIAS signal. When the control signal MF_PI SET_SW is in a 1 state, the level at terminal 1 of switch 40 (here the APPLIED BIAS signal) is used as the APPLIED BIAS signal. That is, when the control signal MF_PI_SET_SW is in state 2, the APPLIED BIAS signal remains as the APPLIED BIAS signal, i.e., is frozen, until the state of the control signal MF_PI_SET_SW changes to either the 0 state or the 2 state. When the control signal MF_PI_SET_SW is in a 2 state, the level at terminal 2 of switch 40 (here the limited BIAS signal produced by subtractor 22) is used as the APPLIED BIAS signal.

Thus, as indicated in the logic 44, if the pedal position is greater than pedal position hysteresis 1, the state machine changes state placing the MFGOV_PI_SET_SW signal in state 1. In state 1, the limited BIAS signal (i.e., base fuel demand from the idle speed fuel controller 12 minus the idle fuel hysteresis) produced by subtractor 22 is coupled through switch 40 as the APPLIED BIAS signal. The modified pedal position fuel is thus equal to the unmodified pedal position fuel+(base fuel demand from the idle speed fuel controller 12 minus the idle fuel hysteresis). If, on the other hand, the pedal position is not greater than pedal position hysteresis 1, the state machine remains in state 2.

When, the pedal position exceeds the pedal position hysteresis 1 and the modified pedal position fuel (now equal to the unmodified pedal position fuel+(base fuel demand from the idle speed fuel controller 12 minus the idle fuel hysteresis)) exceeds the base fuel demand from the idle speed fuel controller 12, the modified pedal position fuel signal ((now equal to the unmodified pedal position fuel+(base fuel demand from the idle speed fuel controller 12 minus the idle fuel hysteresis)) passes through switch 26 as the fuel delivery signal for engine 11. Also, the state machine 20 places the MFGOV_PI_SET_SW signal in state 1. This freezes the APPLIED BIAS signal at the limited BIAS signal (i.e., base fuel demand from the idle speed fuel controller 12 minus the idle fuel hysteresis) produced by subtractor 22. The modified pedal position fuel is thus frozen equal to the unmodified pedal position fuel+(base fuel demand from the idle speed fuel controller 12 minus the idle fuel hysteresis). The modified pedal position fuel signal ((now equal to the unmodified pedal position fuel+(base fuel demand from the idle speed fuel controller 12 minus the idle fuel hysteresis)) continues to pass through switch 26 as the fuel delivery signal for engine 11 until such time as the pedal position reduces to a position less than pedal position hysteresis 0 and the modified pedal position fuel (now equal to frozen equal to the unmodified pedal position fuel+(base fuel demand from the idle speed fuel controller 12 minus the idle fuel hysteresis)) falls below the base fuel demand from the idle speed fuel controller 12. In such event, the logic state of GOV_CL switches to a logic 0 and the state machine is again initialized with the idle speed fuel controller 12 providing the fuel signal through switch 26 to the engine 11.

A number of embodiments of the invention have been described. Nevertheless, it will be understood that various modifications may be made without departing from the spirit and scope of the invention. Accordingly, other embodiments are within the scope of the following claims.

What is claimed is:

1. A fuel control system for an internal combustion engine, comprising:

a signal generator generating an unmodified fuel demand signal based on an accelerator pedal position; and, a controller for producing a modified fuel demand signal based on said unmodified fuel demand signal and a bias value, said bias value being a predetermined offset from a base fuel demand signal, said base fuel demand signal being sufficient to maintain the engine in an idle condition, said controller delivering an amount of fuel to said engine based on a greater of said modified fuel demand signal and said base fuel demand signal.

2. The fuel control system recited in claim 1 wherein the controller is a semiconductor chip.

3. A fuel control system for an internal combustion engine, comprising:

an idle speed fuel controller generating a base fuel demand signal sufficient to maintain the engine in an idle condition;

an accelerator pedal fuel demand signal generator generating an unmodified pedal position fuel demand signal based on an accelerator pedal position; and, a controller for producing a modified pedal position fuel demand signal, said modified pedal position fuel demand signal being substantially equal to said;

unmodified pedal fuel demand signal increased by a bias value, said bias value being a predetermined offset from the base fuel demand signal, said base fuel demand signal enabling idle operation of said engine, said controller delivering an amount of fuel to said engine based on a greater of said modified fuel demand signal and said base fuel demand signal.

4. The fuel control system recited in claim 1 wherein the controller is a semiconductor chip.

5. A method for controlling fuel for an internal combustion engine, comprising:

providing a first fuel demand signal from an idle speed fuel controller;

providing a second fuel demand signal from a pedal position signal generator;

producing a third fuel demand signal being substantially equal to the second fuel demand signal increased by a bias value, the bias value being a predetermined offset from the first fuel demand signal; and, delivering an actual fuel amount to said engine based on a greater of said first fuel demand signal and said third fuel demand signal.

6. An article of manufacture, comprising:

a computer storage medium having a computer program encoded therein for controlling fuel delivery to an engine, said computer storage medium comprising:

code for receiving a first fuel demand signal from a pedal position signal generator;

code for generating a second fuel demand signal for obtaining an engine idle condition;

code for producing a third fuel demand signal being substantially equal to the first fuel demand signal increased by a bias value, the bias value being a predetermined offset from the second fuel demand signal; and, code for delivering an actual fuel amount to said engine based on a greater of said second fuel demand signal and said third fuel demand signal.

* * * * *